May 5, 1931.   C. H. NORTH   1,804,025
REMOTE MECHANICAL BRAKE CONTROL FOR TRAILERS
Filed June 27, 1927
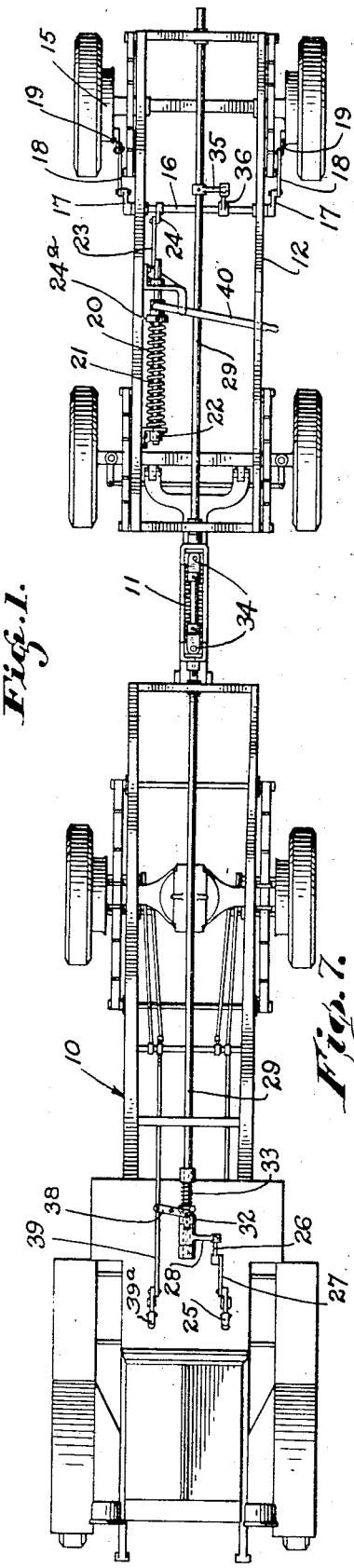
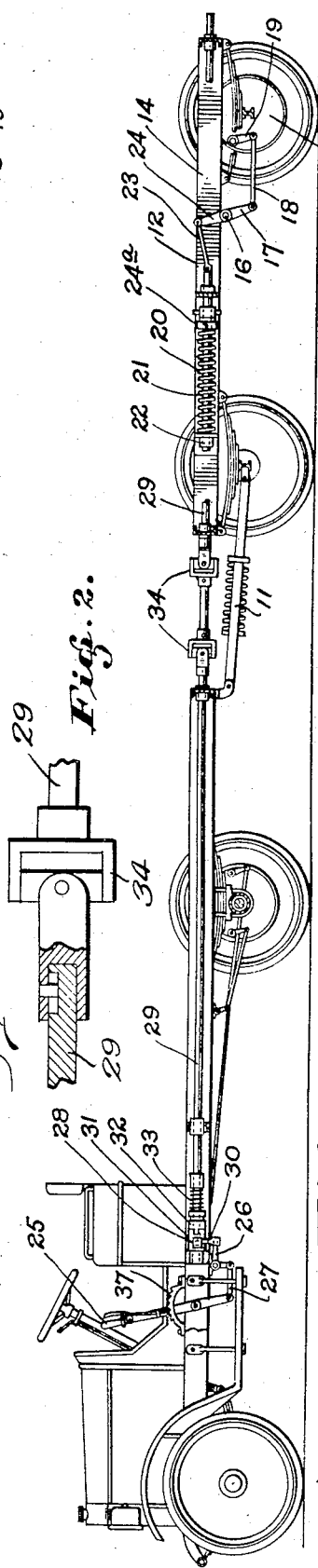
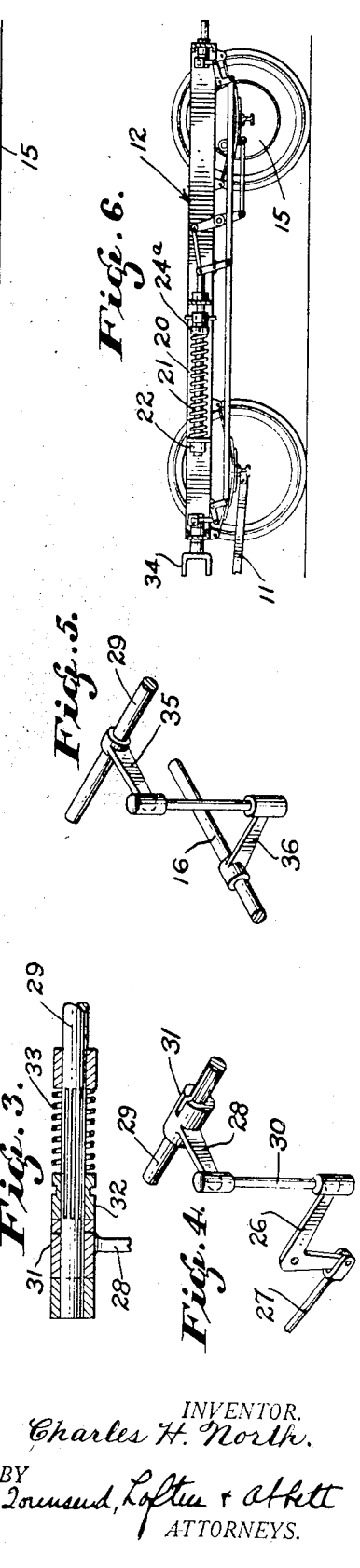
INVENTOR.
Charles H. North.
BY Townsend, Loftus & Abbett
ATTORNEYS.

Patented May 5, 1931

1,804,025

UNITED STATES PATENT OFFICE

CHARLES H. NORTH, OF SAN FRANCISCO, CALIFORNIA

REMOTE MECHANICAL BRAKE CONTROL FOR TRAILERS

Application filed June 27, 1927. Serial No. 201,736.

This invention relates to automotive vehicles, and particularly pertains to a mechanical brake actuating mechanism for trailers. Prior to my invention it has been common practice to connect the trailer brakes with a tractor through the medium of rigid brake rods, which act to transmit any relative longitudinal movement of the tractor and trailer to the brakes of the latter. Under certain conditions this has often resulted in partially applying the trailer brakes when under a heavy pulling strain, particularly when the tractor and trailer were connected by draw bars permitting a certain amount of flexibility between the tractor and trailer. When equipped with this prior type of brake actuating mechanism the trailers were unrestrained once the connection between them and the tractor had been disrupted or disconnected.

It is the principal object of the present invention to provide a generally improved brake actuating mechanism for trailers which will be unaffected by relative longitudinal movement between the tractor and trailers, and by means of which the brakes of the trailers may be fully controlled from the tractor and will be automatically applied the instant the trailers are disconnected from the tractor. In carrying out the invention into practice I provide the trailers with a brake actuating mechanism which normally tends to maintain the brakes applied. This brake actuating mechanism is controlled from the tractor, so that during operation the brakes will be maintained released but will act automatically upon operation of the control mechanism to apply the brakes.

One form which the invention may assume is exemplified in the following description, and illustrated by way of example in the accompanying drawings, in which:

Fig. 1 is a plan view of a tractor having a connected trailer and disclosing diagrammatically the preferred embodiment of my invention.

Fig. 2 is a side elevation of a tractor and trailer with the parts of the latter broken away to more fully disclose the brake actuating and controlling mechanism.

Fig. 3 is an enlarged fragmentary view of the connection between the brake controlling lever and the brake control shaft.

Fig. 4 is an enlarged fragmentary view in perspective disclosing the mechanism by means of which oscillating movement of the trailer brake control mechanism is translated into rotary movement of the brake control shaft.

Fig. 5 is a similar view in perspective of the mechanism by means of which rotary movement of the brake control shaft is transmitted to the brake rod.

Fig. 6 is a view in side elevation of a trailer with the frame thereof in section disclosing a slightly modified form of the invention.

Fig. 7 is a detail sectional view illustrating the manner of splining the universal joints to the control shaft.

Referring more particularly to the accompanying drawings 10 indicates a tractor of any preferred type or design, which is connected by means of a draw bar structure 11 to a trailer 12. The latter is of the four-wheel type supporting a horizontally disposed frame 14. The rear wheels of the trailer 12 are each equipped with a contracting type of brake 15. It is not essential that the brakes be of the contracting type, as they may be of any other preferred design. Connected with the brakes of the trailer is a brake shaft 16 extending laterally of the trailer frame and fitted at its ends with crank arms 17. These crank arms 17 are connected through the medium of links 18 with crank arms 19 which operate the brakes 15. Through the medium of this connecting mechanism oscillation of the shaft 16 will apply and release the brakes 15. The brakes 15 are normally held applied by means of an expansion spring 20, mounted on a rod 21 and extending longitudinally of the trailer frame and journalled in bearings 22 carried thereby. This rod 21 is connected at one end to a link 23, which in turn is connected to a crank arm 24 secured on the shaft 16 so that longitudinal movement of the rod 21 will be translated into oscillating movement of the shaft 16. The spring 20 normally acts to maintain the rod 21 in a position maintaining the brakes 15 applied.

This is accomplished by the provision of a collar 24 pinned, or otherwise secured, on the rod 21 and against which the spring 20 exerts its expansive force. It is obvious, therefore, that if the spring 20 is not maintained compressed it will maintain the rod 21 in its rearmost position. In this position the brakes 15 will be applied.

To control the brakes 15 of the trailer from the tractor I provide the tractor with a brake control lever 25. This lever is supported on the frame of the tractor in a position that it may be operated from the driver's seat. Reference being had to Fig. 2, it is seen that the lever 25 is pivoted to the frame of the tractor at a point intermediate its ends, and that its lower end is connected with a bell crank lever 26 through the medium of a link 27. This bell crank lever 26 in turn is connected to a crank arm 28 on a brake control shaft 29 through the medium of a thrust link 30. The crank arm 28 is loose on the shaft 29. From this description it will be obvious that oscillating movement of the control lever 25 will, through the medium of the link 27 and the bell crank lever 26 and the thrust link 30, impart a swinging movement to the crank arm 28. It is intended that this swinging movement of the crank arm 28 will operate the control shaft 29, and for this purpose one end of the boss of the crank arm 28 is formed with a dog clutch face 31. A clutch member 32 is splined on the control shaft 29, and is formed with a clutch face cooperating with that on the crank arm 28. This clutch member 32 is normally held in clutching engagement with the crank arm 28 through the medium of a spring 33, so that swinging movement of the crank arm 28 will be imparted to the control shaft 29 through the clutch member 32.

By reference to Figs. 1 and 2 it will be seen that the trailer is likewise equipped with a control shaft 29 which is in alignment with the control shaft 29 on the tractor when the trailer is connected to the tractor by means of the draw bar 11. The two control shafts 29 are connected together by universal joints 34 which I splined on the control shaft as illustrated at 29ª in Fig. 7 so that a certain amount of relative longitudinal movement between the tractor and trailer may occur without interfering in any manner with the brake controlling mechanism. To operate the brakes 15 by the rotation of the control shafts 29 I provide a crank arm 35 on the trailer control shaft which is connected with a crank arm 36 on the brake shaft 16 of the trailer. This connection is such that partial rotation of the control shaft 29 will swing the brake shaft 16 in a direction releasing the brakes. At the same time the crank arm 24 on the shaft 16 will act to shift the rod 21 forwardly and compress the spring 20, rendering the same inoperative. To maintain the brakes released the operating lever 25 is fitted with a ratchet mechanism 37 to maintain it in a set position. To apply the brakes this lever 25 is merely moved to a position releasing the spring 20, which exerts an applying force on the brakes 15 sufficient to set the brakes. In the event that the driver of the tractor by operating the emergency brake lever 39ª applies the emergency brake of the tractor the brakes of the trailer are automatically set. This is accomplished by disengaging the clutch member 32 from the crank arm 28 which disconnects the control shaft 29 from the control lever 25. The moment this disconnection is effected the spring 20 will be free to apply the trailer brakes, as it will move the rod 21 rearwardly and through the medium of the link 23 rotate the brake shaft 16 in a direction causing the brakes to be set. This movement will not be retarded in any manner by the control shafts 29, as the latter will be free to rotate.

To disengage the clutch member 32 from the crank arm 28 a centrally pivoted link 38 is provided, the opposite ends of which are connected to the clutch member 32 and the emergency brake rod 39 of the tractor. The emergency brake rod 39 extends forwardly from the link 38 to the emergency brake operating lever 39ª, as clearly illustrated in Fig. 1 of the drawings. When this brake rod 39 is shifted in the direction causing the emergency brakes of the tractor to be applied it will swing the link 38 about its pivotal point and disengage the clutch member 32 from the crank arm 28. When the emergency brake of the tractor is released the clutch member 32 is automatically reengaged with the crank arm 28 by the spring 33.

In operation of the device the brake mechanism is assembled on the tractor and trailer as described and illustrated, and the trailer is connected to the tractor. To release the brake lever 25 is drawn forwardly far enough to release the brakes. This forward movement of the lever 25 will cause rotation of the control shafts 29, and through the medium of the crank arms 35 and 36 will rotate the brake shaft 16 in a direction releasing the brakes 15 against the action of the spring 20. In applying the brakes the lever 25 is merely released and moved rearwardly, which permits the spring 20 to rotate the shaft 16 and apply the brakes. In cases of emergency when the operator applies the emergency brake of the tractor the control shaft 29 will be released and permit the spring 20 to apply the brakes of the trailer.

One feature of the present invention is that should the trailer become disconnected from the tractor its brakes will be automatically applied by the spring 20. This is obvious, as the control shaft 29 will have no restraining medium and the spring 20 will be free to rotate the brake shaft 16 in a direction setting the brakes on the rear wheels of the trailer. For the purpose of releasing the trailer brakes when the trailer has been disconnected from the tractor I provide a pivoted hand lever 40 which is connected with the collar 24. This lever 40 may be actuated to compress the spring 20 through the collar 24 to release the brakes of the trailer.

In Fig. 6 I have disclosed a slightly modified structure. In this figure the control shaft 29 has been eliminated from the trailer, and a series of links has been substituted therefor. These links are actuated by the turning movement of the control shaft 29 on the tractor, and will act to revolve the brake shaft 16 similarly to the manner in which it is actuated by the control shaft 29 of the structure shown in Fig. 1. From the foregoing it is obvious that the brake mechanism here disclosed will not be affected by any relative longitudinal movement between the tractor and the trailer, and will act or operate efficiently under all conditions. Likewise the brake mechanism is of such a construction that the brakes of the trailer will be automatically applied should it become disconnected from the tractor.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. In combination with a tractor and a trailer of a brake mechanism carried by the trailer, said mechanism including brake setting means constantly tending to set the trailer brakes and comprising a transverse shaft having an operating arm and provided with arms connected with the trailer brakes, a slidable rod pivotally connected with the operating arm of the said transverse shaft, a spring for urging the slidable rod in one direction to apply the trailer brakes, and a manually operable lever pivotally connected with the slidable rod for manually releasing the trailer brakes, a control shaft on the tractor, a control shaft on the trailer, connections between said shafts permitting relative longitudinal movement there between, operative connections between the control shaft on the trailer and the brake setting means whereby rotation of said shaft in one direction will render said brake setting means ineffective and release the brakes, and rotation of the shaft in the other direction will permit said brake setting means to set the brakes, and control means carried by the tractor for controlling the rotation of said shafts.

2. In combination with a tractor having the usual braking apparatus and a trailer of a brake mechanism carried by the trailer, said mechanism including brake setting means constantly tending to set the trailer brakes, a rotatable control shaft for controlling the brake setting means, a control lever on the tractor for operating said shaft, and means actuated by the application of the tractor brakes when the trailer brakes are released for disconnecting the control shaft from the lever and permitting the brake setting mechanism to apply the trailer brakes.

3. The combination with a tractor and a trailer of brake mechanism for the trailer, said brake mechanism including brake setting means constantly tending to set the trailer brakes, said brake setting means comprising a transverse shaft extending across the trailer and having an operating arm and provided with arms connected with the trailer brakes, a rod slidably mounted on the trailer and connected with said operating arm, and a spring for urging the rod in one direction to apply the trailer brakes, a manually operable lever mounted on the trailer and connected with a slidable rod for manually releasing the trailer brakes, and means mounted on the tractor for operating the trailer brakes.

4. The combination with a tractor having the usual braking apparatus, including emergency brake operating mechanism, and a trailer, of brake mechanism carried by the trailer, said brake mechanism including means constantly tending to set the trailer brakes, a rotatable control shaft for controlling the brake setting means, a control lever on the tractor for operating the said shaft, a clutch connecting the control lever with the said shaft, and means connected with the emergency brake operating mechanism for unclutching the control shaft from the control lever to permit the brakes of the trailer to be applied automatically when the emergency brake operating mechanism is operated.

CHARLES H. NORTH.